(12) United States Patent
Shnitzer et al.

(10) Patent No.: US 7,061,901 B1
(45) Date of Patent: Jun. 13, 2006

(54) DATA NETWORK AND PSTN TELEPHONY SYSTEM

(75) Inventors: Shimon Shnitzer, Kiryat Bialik (IL); Ronen Hchman, Kibbutz Saar (IL); Shlomo Tsurri, Kiryat Haim (IL); Doron Shahar, Kiryat Yam (IL)

(73) Assignee: Way2Call Communications Ltd., Natania (IL)

( * ) Notice: Subject to any disclaimer, the term of this patent is extended or adjusted under 35 U.S.C. 154(b) by 0 days.

(21) Appl. No.: 09/392,668

(22) Filed: Sep. 7, 1999

(30) Foreign Application Priority Data

Mar. 4, 1997 (IL) ..................................... 120370

(51) Int. Cl.
*H04L 12/66* (2006.01)
(52) U.S. Cl. .................. 370/352; 370/355; 379/221.11
(58) Field of Classification Search ................ 370/352, 370/261, 354, 355, 356, 353; 379/93.04, 379/221.11, 93.06, 207.01
See application file for complete search history.

(56) References Cited

U.S. PATENT DOCUMENTS

| | | | |
|---|---|---|---|
| 5,473,676 A | 12/1995 | Frick et al. ................... 379/99 |
| 5,495,246 A | 2/1996 | Nichols et al. ............. 341/155 |
| 5,553,122 A | 9/1996 | Haber et al. .................. 379/90 |
| 5,726,984 A | 3/1998 | Kubler ........................ 370/349 |
| 5,727,047 A | 3/1998 | Bentley et al. ............... 379/93 |
| 5,751,706 A | 5/1998 | Land et al. .................. 370/352 |
| 6,169,734 B1 * | 1/2001 | Wilson |
| 6,243,373 B1 * | 6/2001 | Turock |
| 6,363,140 B1 * | 3/2002 | Pinard |
| 6,373,835 B1 * | 4/2002 | Ng et al. |
| 6,463,051 B1 * | 10/2002 | Ford |
| 6,466,550 B1 * | 10/2002 | Foster et al. |
| 6,470,010 B1 * | 10/2002 | Szviatovszki et al. |

FOREIGN PATENT DOCUMENTS

WO  WO 98/37665  8/1998

OTHER PUBLICATIONS

IBM Technical Disclosure Bulletin, Jul. 1995, p. 1, "Computer—Supported Audio Communication".
Quicknet Technologies, Inc., "Talk is Cheap", www.quicknet.net (web address), pp. 1-3, 1995, USA.
Easyphone, "Pure Power for Your Contact Center", www.crmxchange.com/easyphone (web address), pp. 1-3, USA.
Microsoft Product Support Services, "Standard Edition Missing Help Entries for Win32SDK", www.support/microsoft.com (web address), pp. 1-2, USA, Feb. 2000 (info. on WIN32SDK/DDK by Microsoft Development Network).
"Hi-Phone Jr.", product brochure, pp. 1-2, Israel, 1998.
"Hi-Phone", product brochure, pp. 1-2, Israel, 1998.

(Continued)

*Primary Examiner*—Afsar Qureshi

(57) ABSTRACT

An adapter is disclosed which allows attachment of a standard telephone to a computer as a standard peripheral. The adapter converts analog signals of the telephone to digital signals of the computer and vice versa. The adapter can also be a stand-alone device allowing the telephone to be attached to a computer network. The adapter, in this case, contains the computing power to support the necessary data network protocols, and PSTN signalling protocols.

In this way voice communication is enabled over a computer network without requiring the computers to be equipped with sound cards.

8 Claims, 12 Drawing Sheets

OTHER PUBLICATIONS

Shelcad Communications, Israel, "Technology Marketing Corporations CTI Expo Spring '99 Names Shelcad Communications 'Best of the Show'", p. 1.

Shelcad Communications, Israel, "Shelcad, Multiply Your Power to Communicate", p. 1.

Curran, T., "Of the Last Mile", *Internet Telephony*, Jun. 1999, p. 81-84.

Tehrani, R., "Internet Telephony Excitement Fills the Air", *Internet Telephony*, May 1999, p. 42.

"Remote Access: Hi-Phone PCMCIA, Shelcad Communications", *Internet Telephony*, May 1999, p. 42.

"Best of the Show: CT EXPO'S Sweet Sixteen", Computer Telephony.com, Apr. 1999, p. 59.

Shelcad Communications, "Lynk, Shelcad Jointly Develop Volp One-Box Client Solution", Apr. 1999, p. 1.

Shelcad Product Description, "A Complete Computer Telephony Solution in the Palm of Your Hand", pp. 1-2.

Shelcad Product Description, "Shelcad's Network Telephony", pp. 1-2.

Mitel, ISO$^2$ -CMOS MT88L70, 3 Volt Integrated DTMF Receiver, Product Description, pp. 4-23 through 4-32; General 1-11, Issue 4, Mar. 1997.

Mitel, MH88524 Dual 2-4 Wire Circuit, Preliminary Information, Product Description, Issue 4, Apr. 1995, pp. 2-85 through 2-95.

Quicknet Technologies, Inc., "Internet Line JACK™", www.quicknet.net, San Francisco, california, 1999, pp. 1-4.

Motorola Semiconductor Technical Data, MC14LC5480, "Advance Information: 5V PCM Codec-Filter", pp. 1-24, Rev. 0.1, May 1996, USA.

ST®, "WLL+ISDM-TA Subscriber Line Interface Circuit", STLC 3055, Product Description, pp. 1-27, Oct. 1998.

Krypton Isolation, Inc., "K$^2$950 Data Access Arrangement Designer's Guide", Rev. 1, Apr. 1999, pp. 1-23.

Audiocodes, AC48104A-C, "Four Channel Voice Over Packet Processor", Product Description, Israel, pp. 1-2, www.audiocodes.com (web address).

Atmel, "8-Bit AVR Microcontroller with 8K Bytes In-System Programmable Flash", AT90S8515, Preliminary Product Description, Jun. 1998, pp. 1-8.

Mitel Semiconductor, "MT88E45: 4-Wire Calling Number Identification Circuit 2 (4-Wire CNIC2)", Issue 2, Mar. 1999, pp. 1-26, DS5143, canada.

Lynk "Lynk and ShelCad Announce VoIP Clients Enabling Superior-Quality Calls" by Tom Curran Apr. 1999.

The Jerusalem Post "Private Calls on a Portable PC" Apr. 1999.

New Products "Calling From Laptops"*Link*, Feb./Mar. 1999, pp. 8.

"ShelCad Intros Client-Based CTI Solution" *Internet Telephony* Feb. 1999, pp. 19.

ShelCad Communications Ltd. "ShelCad and Lynk Announces Partnership", Mar. 1999.

ShelCad Communications Ltd. "First of Its Kind! Shelcad Communications Ltd. Announces Release of Their Latest Technology: Hi-Phone PCMCIA" Mar. 1999.

ShelCad Communications Ltd. "First VoIP Capable PCMCIA Card Enters the Market" Mar. 1999.

ShelCad Communications Ltd. "ShelCad Engineering Ltd. will be previewing the Hi-Phone Jr., its latest innovation for the Computer Telephony Integration (CTI) Market on Dec. 1st-4th at CTI Expo Fall 1998 in San Jose, California." Nov. 1998.

ShelCad Communications Ltd. "CTI EXPO: ShelCad Plans Previews of Palm-Based CTI Solution" Nov. 1998.

ShelCad Communications Ltd. "ShelCad Intros Client-Based CTI Solution" Dec. 1998.

ShelCad Communications Ltd. "Client-Based CTI: Integrated Products Make It Mainstream" by Tom Curran Dec. 1998.

Altitude Software "Technologic Position of the Company" http://www.easyphone.com/home.html Aug. 2000.

Best of CTI Expo Fall 1998 Presented to ShelCad Engineering Ltd. Hi-Phone, Feb. 1999.

VocalTec™ Communications, "VocalTec Telephony Gateway, Series 120", pp. 1-4, www.vocaltec.com, 1999.

Rendleman, "Lucent Offers Net Telephony", *Communic. Week*, Apr. 7, 1997, p. 14.

Kopf, The Second Network?, *America's Network*, Mar. 15, 1997, pp. 58-60.

Salamone, "Riding the Internet", *Communic. Week*, Feb. 17, 1997, p. 36.

Smith, S., Microsoft Corp., *Multimedia Device Drivers*, "Audio Device Drivers", pp. 59-159, Created Oct. 17, 1995.

* cited by examiner

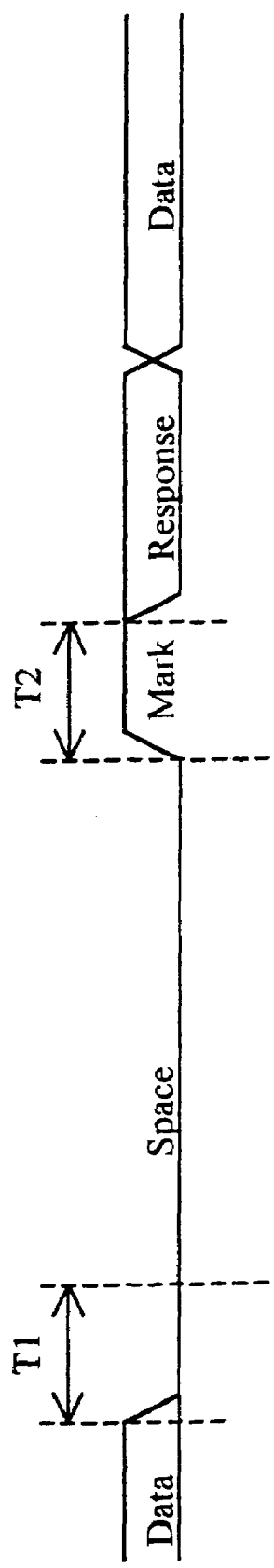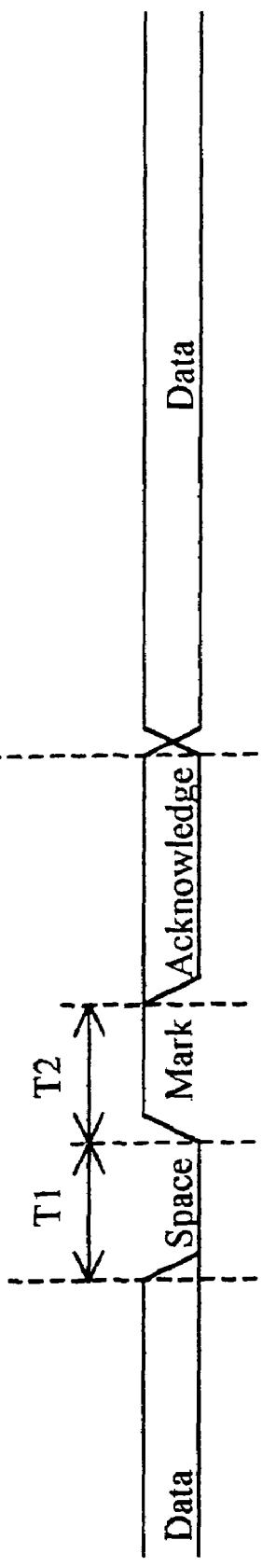
FIG. 7

DATA NETWORK AND PSTN TELEPHONY SYSTEM

FIELD OF THE INVENTION

The present invention relates to data network and PSTN phone systems.

BACKGROUND OF THE INVENTION

The Internet telephone conversation is known. It has been possible for some time to have a voice conversation over the Internet, or other forms of computer network using a personal computer with a sound card, microphone, and speakers or an earphone. More recently there have been provided dedicated systems comprising a telephone keypad, receiver and screen. However such devices still require a sound card in order to work.

Common methods for voice communication over a computer network employ a sound card on each machine participating in the conversation.

Modified sound cards that enable a telephone to connect to a PC, are commercially available. For example, Phonejack and Linejack, by Quicknet Technology (www.quicknet.net), and Easyphone by Mediasonic (www.easyphone.com) enable a user to make telephone calls over the Internet using a PC related internal ISA card.

U.S. Pat. No. 5,553,122 to Haber et al; U.S. Pat. No. 5,495,246 to Nichols et al.; and U.S. Pat. No. 5,727,047 to Bentley et al. describe methods and apparatus for interfacing computing devices to an analog telephone network.

U.S. Pat. No. 5,473,676 to Frick et al. describes an interface system connected between the telephone base and handset which allows switching between voice and data communications over a single telephone line.

The disclosures of all publications mentioned in the specification are hereby incorporated by reference.

SUMMARY OF THE INVENTION

According to a first aspect of the present invention there is provided an adapter comprising an analog to digital converter, for connecting a telephone set to a computer.

In an embodiment the adapter may comprise a first output port configured as a telephone socket for attachment of a telephone plug. Preferably the adapter comprises, in addition, one or more additional output ports, configured as telephone sockets and each having a unique address.

The adapter may also have a look-up table for translating numerical address information entered at a key pad of the telephone into addresses on the computer. Alternatively, or additionally, the look-up table may be for translating numerical information entered at a key pad of the telephone into addresses on a network to which the computer is attachable. Alternatively or additionally the lookup table may contain Internet addresses and the computer may have access to the Internet.

According to a second aspect of the present invention there is provided an adapter comprising an analog to digital converter, for connecting a telephone set to a computer network.

In a preferred embodiment a first output port of the adapter is configured as a telephone socket for attachment of a telephone plug. In a variation of this embodiment the adapter may further comprise one or more additional output ports, likewise configured as telephone sockets and each having a unique address.

Preferably the adapter contains a look-up table for converting numerical data entered at a keypad of the telephone into addresses on the network. The network may for example be the Internet.

The adapter may be a standalone device, that is to say an adapter that is able to send data directly to the network without requiring the intermediacy of a computer, and may comprise a module for operating an Internet protocol.

According to a third aspect of the invention there is provided the use of a telephone as a peripheral device for a computer.

The telephone may be operatively attached to the computer via an adapter which is operable to convert digital signals output from the computer into analog signals for input to the telephone and to convert analog signals output from the telephone into digital signals for input to the computer. The telephone is thus usable for conducting voice communication over any network to which the computer is attached.

According to a fourth aspect of the present invention there is provided the use of a telephone as a peripheral device for a computer, the computer comprising control software for managing said telephone. The control software may be encryption software or it may be exchange management software that carries out the types of function provided by office based exchange equipment.

There is further provided according to another preferred embodiment of the present invention, a telephone communication system providing communication between a multiplicity of telephone instruments via a PSTN and a computer network, the system including a digital telephone switch controller interfacing between a local telephone instrument, the PSTN and a computer connected to the computer network and operative to analyze at least signalling information arriving from at least one of the local telephone instrument, the PSTN and the computer network and to responsively transmit at least one of voice information and signalling information to at least one of the local telephone instrument, the PSTN and the computer network.

There is additionally provided according to another preferred embodiment of the present invention, a telephone system with local ringing voltage generation, the system including a local ringing voltage generator operative to locally apply single line ringing voltage to a telephone instrument, thereby to induce the telephone instrument to produce a ringing tone, and a voltage generator actuator operative to actuate the local ringing voltage generator upon receipt of a single line voltage generation actuation signal from a remote public system telephone network.

Further in accordance with a preferred embodiment of the present invention, the telephone system also includes a public system telephone network operative to send a voltage generation actuation signal to the voltage generator actuator which signal is incapable of directly actuating the telephone instrument to produce a ringing tone.

There is also provided according to another preferred embodiment of the present invention, a method for setting up a conference call between three participants, the method including providing a digital telephone switch controller interfacing between a local telephone instrument, the PSTN and a computer connected to the computer network and operative to analyze signalling information and voice information arriving from at least one of the local telephone instrument, the PSTN and the computer network and to responsively transmit at least one of voice information and signalling information to at least one of the local telephone instrument, the PSTN and the computer network, and using the digital telephone switch controller to set up a conference call between the local telephone instrument, a remote telephone instrument, via the PSTN, and a remote subscriber to the computer network, via the computer network.

Still further in accordance with a preferred embodiment of the present invention the controller receives digital voice information from the remote computer network subscriber, via the computer network.

Additionally in accordance with a preferred embodiment of the present invention, the controller receives analog voice information from the local telephone instrument.

Further in accordance with a preferred embodiment of the present invention, the controller receives analog voice information from the PSTN.

Also in accordance with a preferred embodiment of the present invention, the controller is operative to analyze signalling information and voice information arriving from at least one of the local telephone instrument, the PSTN and the computer network.

There is further provided according to another preferred embodiment of the present invention, a telephone communication system providing communication between a multiplicity of telephone instruments via at least one PSTN and at least one computer network, the system including a digital telephone switch controller interfacing between a local telephone instrument, the PSTN and a computer connected to the computer network and operative to analyze at least signalling information arriving from at least one of the local telephone instrument, the PSTN and the computer network and to perform local least cost call routing of corresponding voice information to a remote telephone instrument.

Further in accordance with a preferred embodiment of the present invention, the switch controller is operative to mix voice information arriving from the local telephone instrument with voice information arriving from the PSTN.

There is additionally provided, according to another preferred embodiment of the present invention, a telephone communication system providing communication between a multiplicity of telephone instruments via a PSTN and a computer network, the system including a digital telephone switch controller interfacing between a local telephone instrument, the PSTN and a computer connected to the computer network and operative to analyze at least signalling information arriving from at least one of the local telephone instrument, the PSTN and the computer network and to route at least one of voice information and signalling information accordingly.

Still further in accordance with a preferred embodiment of the present invention, the adapter is implemented on a PC card.

There is further provided, according to another preferred embodiment of the present invention, a telephone communication system providing communication between a multiplicity of telephone instruments via a PSTN and a computer network, and operative to record the communication at a local level, the system including a recording device for recording the communication at the local level, and a digital telephone switch controller interfacing between a local telephone instrument, the PSTN and a computer connected to the computer network, and operative to route voice information arriving from at least one of the local telephone instrument, the PSTN and the computer network to the recording device.

There is further provided, according to another preferred embodiment of the present invention, a telephone communication system providing communication between a multiplicity of telephone instruments, a PSTN, and a computer network, the system including a digital telephone switch controller interfacing with a computer connected to the computer network, and an adapter interfacing with a local telephone instrument and a PSTN, wherein the adapter is a PC card.

Still further in accordance with a preferred embodiment of the present invention, the digital telephone switch controller includes a slot for a PC card.

BRIEF DESCRIPTION OF THE DRAWINGS

For a better understanding of the invention and to show how the same may be carried into effect, reference will now be made, purely by way of example, to the accompanying drawings in which.

FIG. 7 is a timing diagram illustrating the responses of telephone equipment under the control of the media and signalling processor of FIG. 5;

DESCRIPTION OF THE PREFERRED EMBODIMENTS

Figure 1:
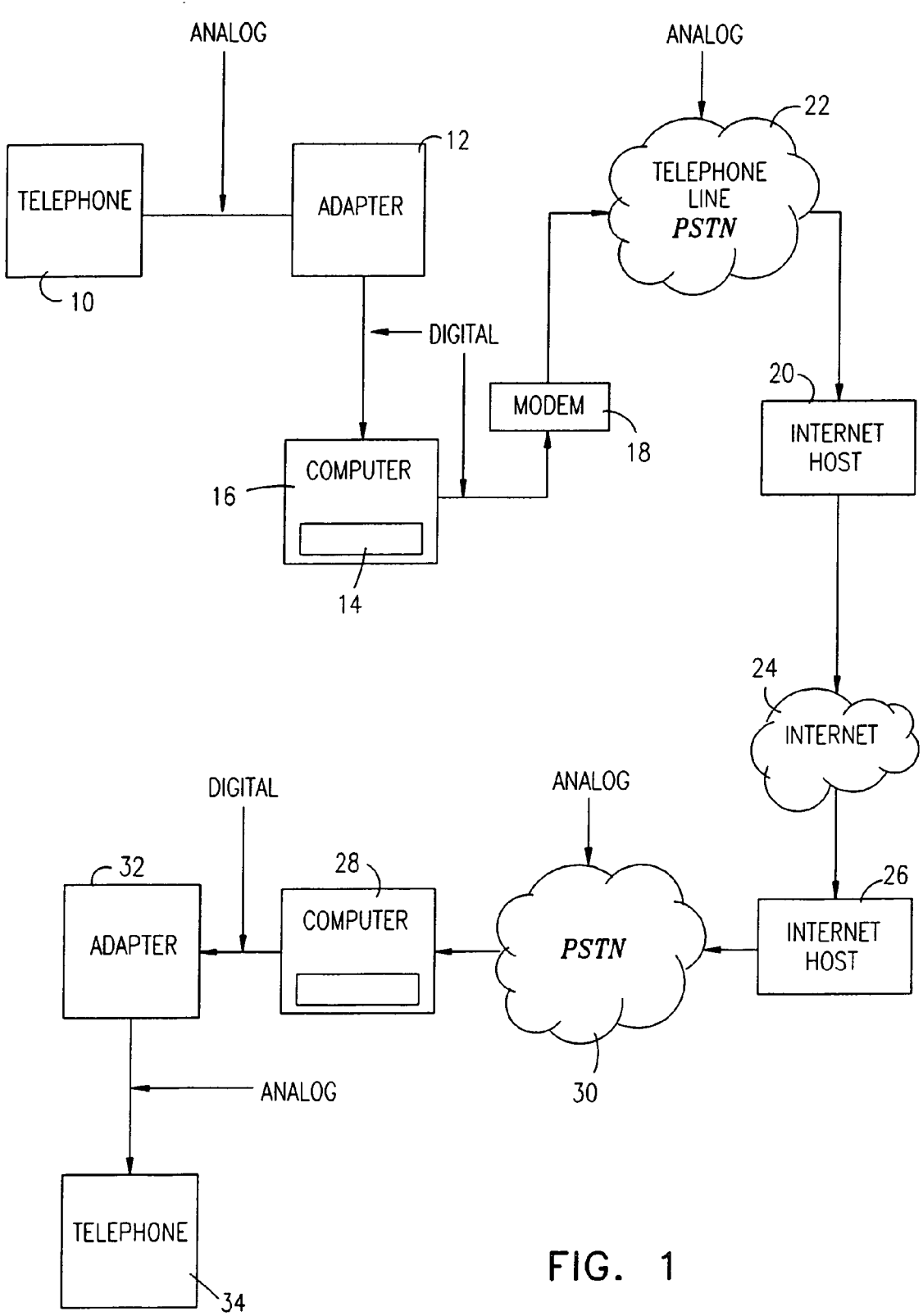
FIG. 1 shows a network operative in accordance with the present invention.

FIG. 1 shows a network operative in accordance with a preferred embodiment of the present invention.

A telephone 10, which produces analog signals, is preferably connected to an adapter 12. The adapter 12 preferably translates those analog telephone signals into digital data so that the telephone can be connected via the adapter 12 to a standard computer 16. The adapter thus allows an ordinary telephone to appear as a peripheral device to a computer. The computer 16 in turn may be connected to a computer network such as a company LAN, WAN, or the Internet.

Preferably the adapter not only translates the data into analog signals but also arranges the data into packets with address information. Address information is of two forms. Firstly there is address information of a target address that the device wishes to communicate with. As the telephone 10 is a standard telephone it is unable to provide Internet addressing information in the standard format because individual alphabetic characters are not provided on a standard telephone keypad. It is however possible to input a full numerical IP address or a short code which is used in a lookup table 14 to generate an address recognizable to the Internet, or for that matter any other network that may be in use.

The look-up table 14 may be located in the adapter 12 or it may be located in a computer 16 to which the adapter is connected. The computer may be equipped with a modem 18 or network card and is preferably capable of running the necessary protocols to communicate via the network. In the case of the Internet this means that the computer is preferably able to run the TCP/IP protocol, for example, and will be able to connect to an Internet host 20 via the telephone network 22.

The Internet is able, in the standard manner, to determine from the address information how to direct the data packets received from computer 16 over the Internet 24 to the correct host 26 of the called party. The host 26 is either already in contact with the computer 28 of the called party or, in a further embodiment, it makes contact via the local telephone network 30. The signal is preferably relayed from the computer 28 to an adapter 32 of the called party, where it is preferably converted into analog signals and is thus made available to telephone 34.

It is noted that the invention does not require both parties to the conversation to have a telephone connected to an adapter of the invention. It is possible for the calling party to have a computer with standard Internet telephone equipment, sound card and software. In this case adapter 32 of the called party need only be provided with software that allows it to deal with sound files of a format produced by the sound card of the calling party. It is also possible, if the calling party has a telephone connected to an adapter according to the invention which itself has access to the public telephone network, PSTN, for the called party simply to have an adapter and telephone without being connected to any computer network. Thus the calling party is preferably able to utilize spare capacity on the network and is nevertheless able to communicate with people not having a presence on that network.

If the network to which the calling party is connected is the Internet and the called party does not have an Internet connection the table 14 preferably indicates a remote Internet host that is located physically close to the called party, that is to say, preferably a local phone call away. The table preferably further provides a phone number so that the remote Internet host can dial and thus a long-distance or international phone call can be made for the price of two local phone calls.

Figure 2:
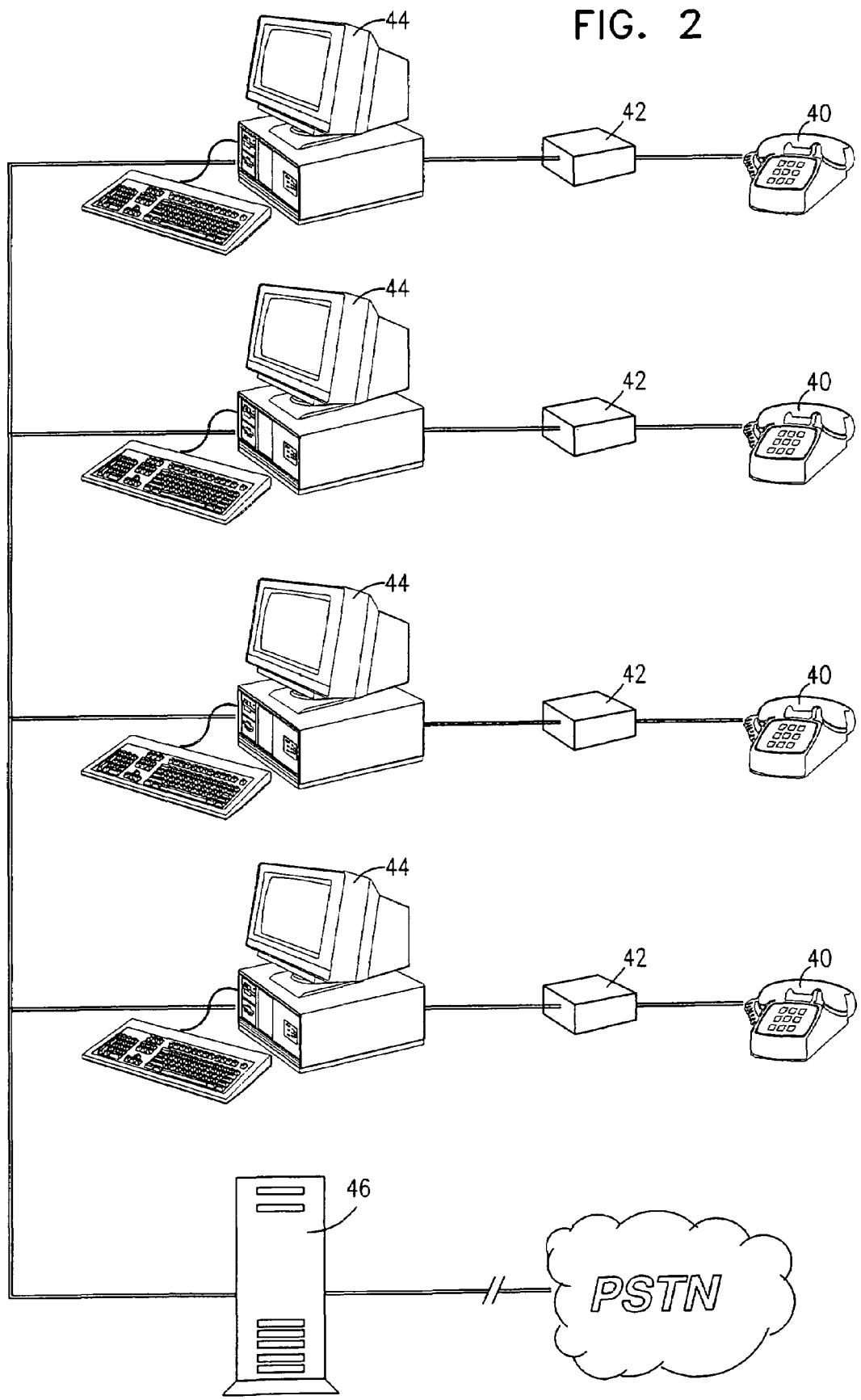
FIG. 2 shows another network operative in accordance with the present invention.

FIG. 2 shows a local network, such as a company Intranet. A plurality of telephones 40 are connected via a plurality of adapters 42 to a plurality of computers 44. The computers are all linked together via a LAN or WAN of any appropriate type. A server 46 is provided which links the LAN to the Internet and the telephone network.

At present many organizations have WANs of one sort or another linking various sites. However the WAN is rarely used for voice communication between various sites because the computers are not all equipped with sound cards. Thus voice communication has to use the telephone network and spare bandwidth on the WAN is wasted. However, in preferred embodiments of the present invention a sound card is not necessary, neither is the purchase of a dedicated microphone and speakers. All that needs to be done is to connect an existing telephone set, via an adapter of the present invention, to a computer on the network and voice communication via the computer is rendered possible.

Figure 3:
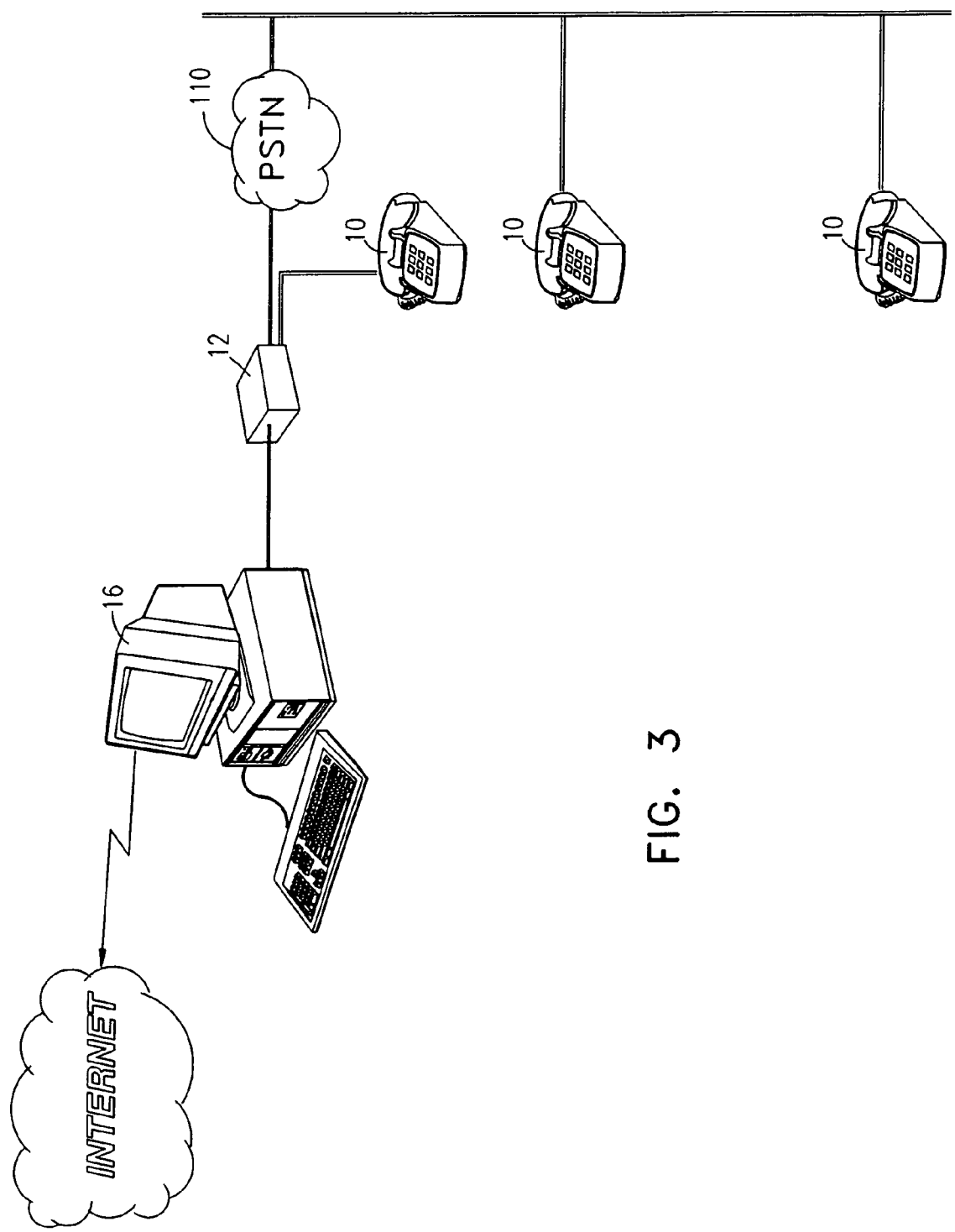
FIG. 3 shows a plurality of telephones connected to a single computer, in accordance with a further embodiment of the present invention.

FIG. 3 shows how more than one telephone 10 may be connected to a single adapter 12. The adapter preferably has more than one port to which a telephone lead may be attached. Each port typically has a unique address, which is used in preparing headers for packets of data issuing from that port. Thus data packets produced by the adapter can be sent by computer 16 out to the Internet without the computer needing to know about the fact that different packets come from different telephones. Similarly incoming packets, because they include the port address, can be directed to the correct port on the adapter without any difficulty and without interfering with conversations being conducted via the other telephones.

Figure 4:
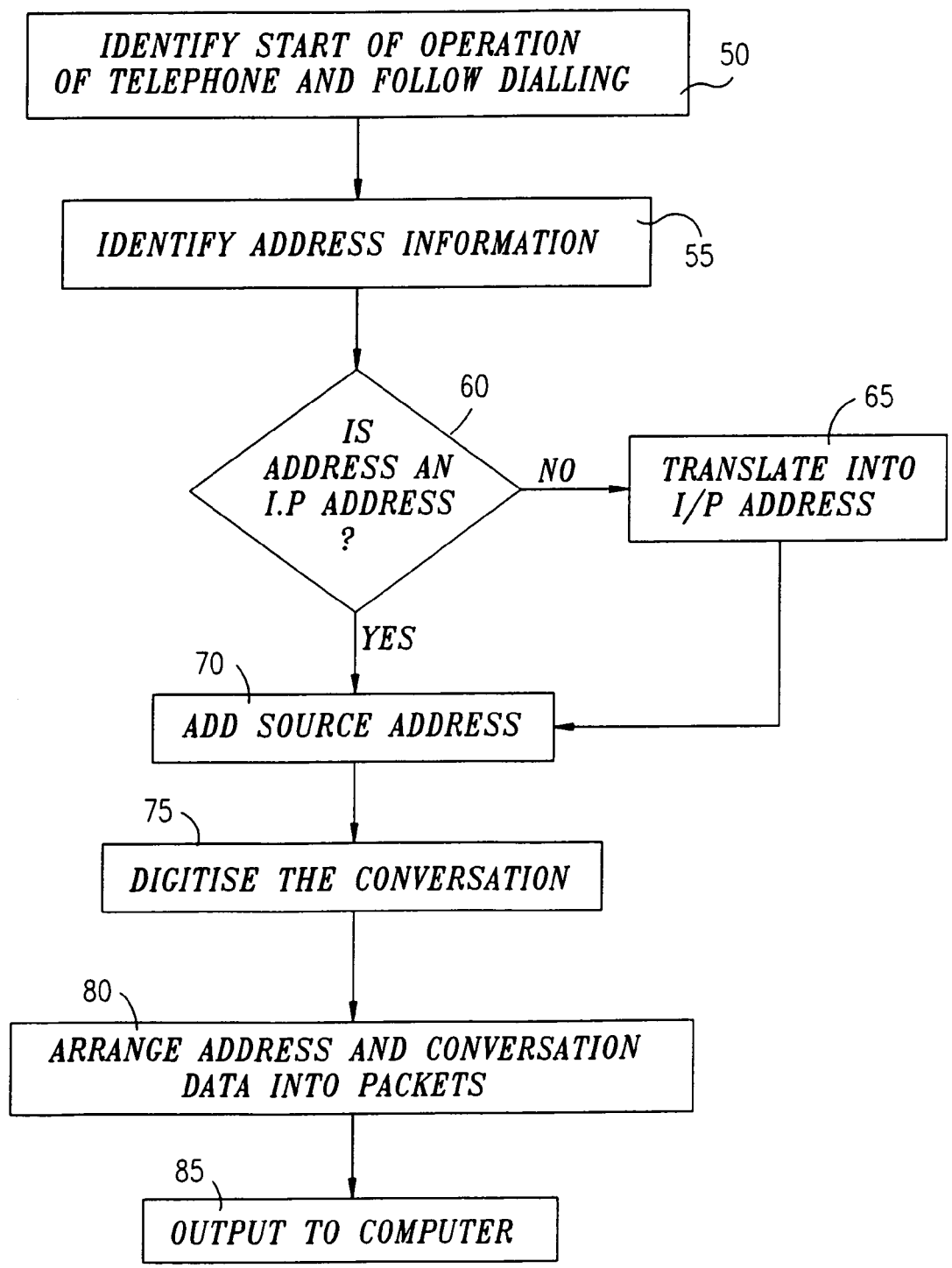
FIG. 4 is a flow diagram of a method of operation of an embodiment of the present invention.

FIG. 4 is a flow diagram of a preferred method of operation of the adapter 12. In step 50 the adapter identifies the start of a call. It is sensitive to the tones or pulses used in dialing and records the digits being dialed. The dialed digits are taken to be address information 55. The format of the dialed information is checked in step 60 and if it is found to be in IP address format then that is used directly to address the data packets. If not then the lookup table is used in step 65 to translate into an IP address.

In step 70 a source address is prepared. The source address includes the IP address of the calling party and also, in the case of multiple telephone ports on a single adapter, the address of the port from which the conversation is being sent.

Once the address information is completed and a connection is established, the adapter has the task, step 75, of digitizing the conversation itself. The digitized conversation is arranged in the aforementioned data packets, step 80, and is output to the computer in step 85 as data packets ready for the TCP/IP protocol or the like.

In a preferred embodiment of the present invention the part of the operation carried out by the computer can also be carried out internally within the adapter so that the telephone does not need to be connected to a computer. In this case the only additional ability that the adapter typically employs is the processing power to support TCP/IP and to carry out the functions of a modem. Also the lookup table 14 is preferably stored internally of the adapter. As an alternative to storing the lookup table 14 internally of the adapter it is possible to have the lookup table 14 stored on a computer to which the adapter has access.

In an adapter having more than one telephone port, a preferred embodiment is able to recognize the address of another of its own ports when dialed. Thus a conversation between two telephones connected via the same adapter is possible.

An advantage of a preferred embodiment of the present invention is that a standard telephone can utilize qualities of the computer or of the network. For example the computer, or adapter may have encryption software. The encryption software may be any encryption software and may include software that is used for encryption over the telephone network or any software that is used for encryption over the computer networks such as the Internet. Encryption standards that may be used include, for example, one-way hashed protocols such as MD5 and two-way hashed protocols based upon DES.

It is also possible, through use of the appropriate software, to ensure that the appropriate packets are delivered to more than one address. Thus the source telephone acts as a multicast or broadcast system. It is also possible to provide software to support conference calling; that is to say, there is provided exchange management software for managing different types of telephone call. At present the software for doing this is generally located in a costly telephone exchange device.

Figure 5:
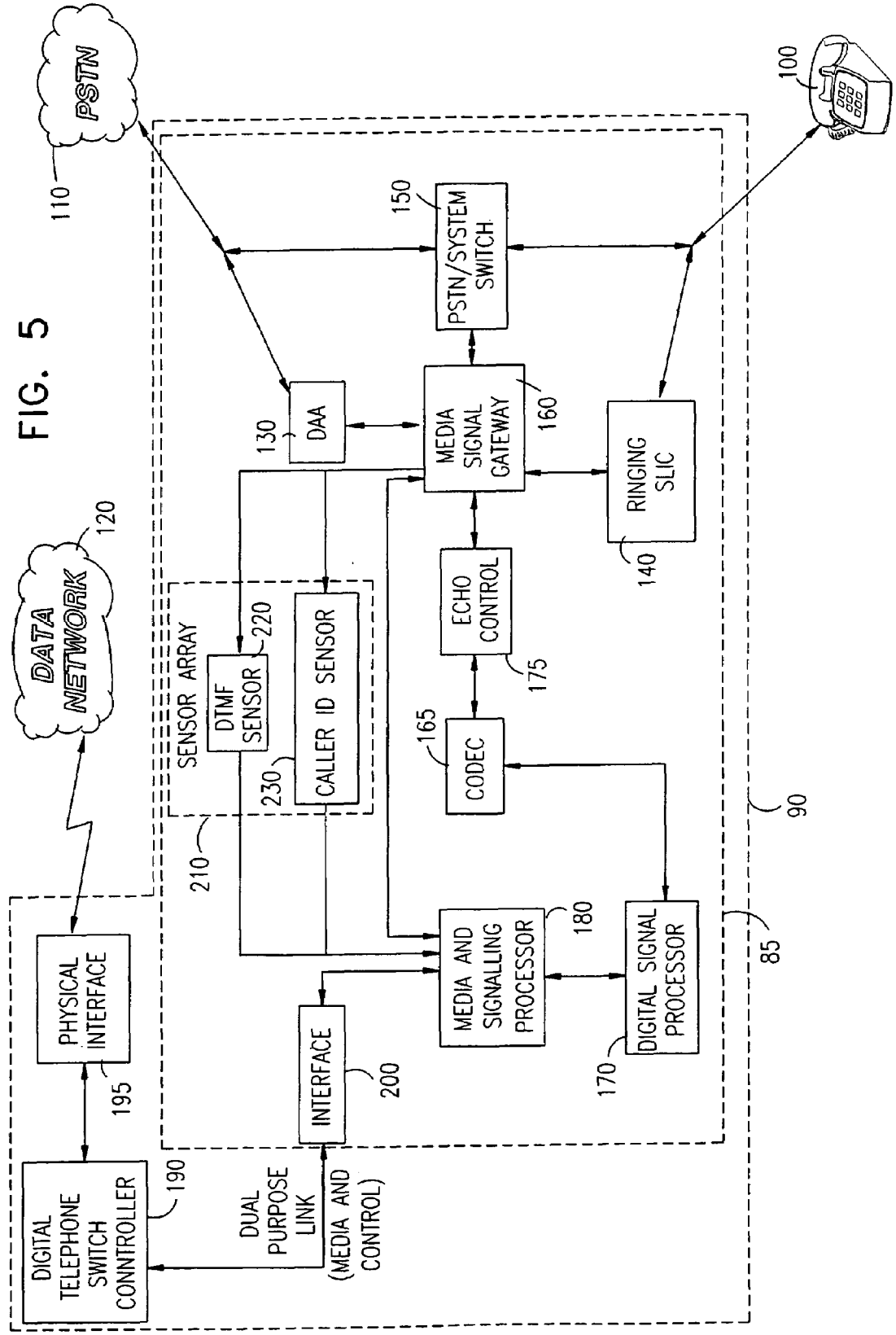
FIG. 5 is a simplified functional block diagram of a telephone communication system providing communication between conventional telephone instruments, a PSTN and a computer network, constructed and operative in accordance with a preferred embodiment of the present invention.

Reference is now made to FIG. 5 which is a simplified functional block diagram of a telephone communication system 90 providing communication between conventional telephone equipment, a PSTN 110 and a data network 120, the system being constructed and operative in accordance with a preferred embodiment of the present invention. The data network 120 may for example comprise the Internet or an intranet.

The system 90 of FIG. 5 typically interfaces with PSTN 110 as a normal subscriber via a DAA (direct arrangement access) unit 130 which may for example comprise a K951C and K592C chip set DAA unit commercially available from Krypton Isolation, Pleasanton, Calif., USA. Preferably, a PSTN/system switch 150 is provided which provides selective engagement of the telephone equipment 100 with either the system 90 or the PSTN 110. The DAA unit 130 and a ringing SLIC (subscriber line interface circuit) unit 140 preferably feed into a media signal gateway 160 (described in detail in FIG. 6), an echo control unit 175, a codec 165, a digital signal processor (DSP) 170, a media and signalling processor 180, and finally to a digital telephone media and switch controller 190 via an interface 200, such as an RS232, USB, parallel port, wireless connection, PC card, PCMCIA etc., generating a dual purpose link (media and control) between itself and the digital telephone media and switch controller 190. It is appreciated that in a preferred embodiment, interface 200 may not interface with a PC, but may comprise a proprietary interface with a standalone microprocessor, such as a digital telephone switch.

The digital telephone media and switch controller 190 is typically connected to the data network 120 via a physical interface 195 which may, for example, comprise a BCM4502 interface unit commercially available from Broadcom Corporation, Irvine, Calif., USA, which is suitable for Ethernet use. The physical interface 195 may alternatively comprise an interface suitable to connect to one or more of the Internet, Ethernet, ATM, power line, HPNA (two wire telephone line), GSTN (general switch telephone network, such as DSL, frame relay, ISDN, analog etc.), wireless connection, infra red connection, cable TV etc.

The ringing SLIC 140 may for example comprise an STLC3055, unit commercially available from SGS Thompson Microelectronics, San Jose, Calif., USA.

Codec 165 may for example comprise an MC145480 codec unit commercially available from Motorola Semiconductors, Irvine, Calif., USA.

Digital signal processor 170 may for example comprise an ACA481xx unit commercially available from Audiocodes Communications, Yehud, Israel.

Echo control unit 175 may, for example comprise a MH88524 echo cancellation unit commercially available from Mitel Semiconductors, Kanata, Ontario, Canada.

Media and signalling processor 180 may for example comprise an AT90S8515 microprocessor commercially available from Atmel Corporation, San Jose, Calif., USA. A simplified illustration of a preferred implementation of the media and signalling processor 180 is described with reference to FIGS. 7 and 8.

In a preferred embodiment, the device 85 may comprise the adapter 12 of FIG. 3; and the digital telephone media and switch controller 190, and the physical interface 195 are located within the PC 16 of FIG. 3.

Typically, a sensor array 210 is provided between the media signal gateway 160 and the media and signalling processor 180, the sensor array 210 typically comprising a DTMF (dual tone multi-frequency) sensor 220 and a caller ID sensor 230. Alternatively, the sensor array 210 may be omitted and the functionality of the sensor array 210 may be integrated into the functionality of digital signal processor 170.

DTMF sensor 220 may for example comprise an MT8070 DTMF receiver commercially available from Mitel Semiconductors, Kanata, Ontario, Canada.

Caller ID sensor 230 may for example comprise an MT88e45 caller ID receiver commercially available from Mitel Semiconductors, Kanata, Ontario, Canada.

The codec unit 165 is typically operative to convert digital signals to analog signals, and analog signals to digital signals. The echo control unit 175, which preferably comprises a standard 2 wires to 4 wires echo cancellation unit functionality, typically clears analog signals and eliminates echo therefrom. The DSP 170 typically performs echo control on digital signals, however the echo control unit 175 may be omitted and the analog echo control functionality of unit 175 incorporated into the DSP 170.

In the illustrated embodiment, the telephone equipment 100 typically comprises a non-cellular telephone instrument, however, alternatively, a cellular telephone instrument may be employed in which case suitable modifications are made to the system of FIG. 5 to take into account the precise cellular communication interface and protocol. In an alternative embodiment the telephone equipment 100 may comprise complementary telephony equipment, such as a caller ID unit, a FAX or a modem.

Figure 6:
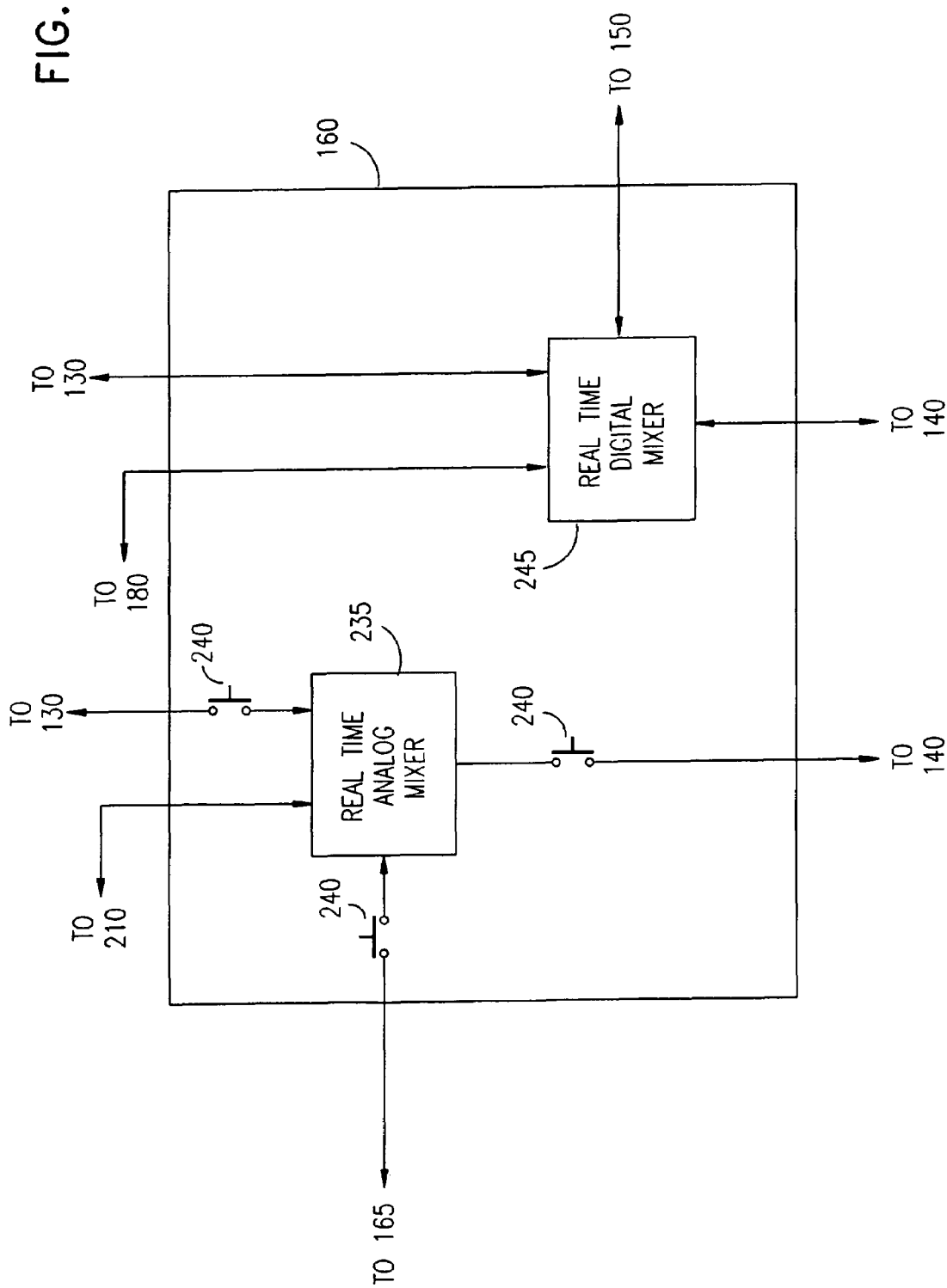
FIG. 6 is a simplified functional block diagram of a preferred implementation of the media signal gateway of FIG. 5, constructed and operative according to a preferred embodiment of the present invention.

Reference is now made to FIG. 6 which is a simplified functional block diagram of a preferred implementation of media signal gateway 160.

The media signal gateway 160 preferably comprises a real time analog mixer 235 operative to control the direction of flow of analog signals to and from the media signal gateway 160. Control over the three switches 240 typically allows the real time analog mixer 235 to receive and transmit analog signals from any of three different sources: the PSTN 110 via DAA 130; the telephone equipment 100 via the ringing SLIC 140; and the data network 120 via the codec 165.

The real time analog mixer 235 is preferably operative to eliminate one or more of the analog signals while keeping the amplitude constant by using a method such as an automatic gain control (AGC) method. The real time analog mixer 235 is also preferably operative to transfer voice information to the sensor array 210.

The media signal gateway 160 preferably also comprises a real time digital mixer 245 operative to control the direction of flow of analog signals to and from the media signal gateway 160. The real time digital mixer 245 is preferably operative to receive and transmit digital control signal information to and from telephone equipment 100 via the ringing SLIC 140; the PSTN via the DAA 130; and the data network 120 via the codec 165. The real time digital mixer 245 is also preferably operative to receive and transmit digital control signal information to and from the PSTN/system switch 150.

Figure 8:
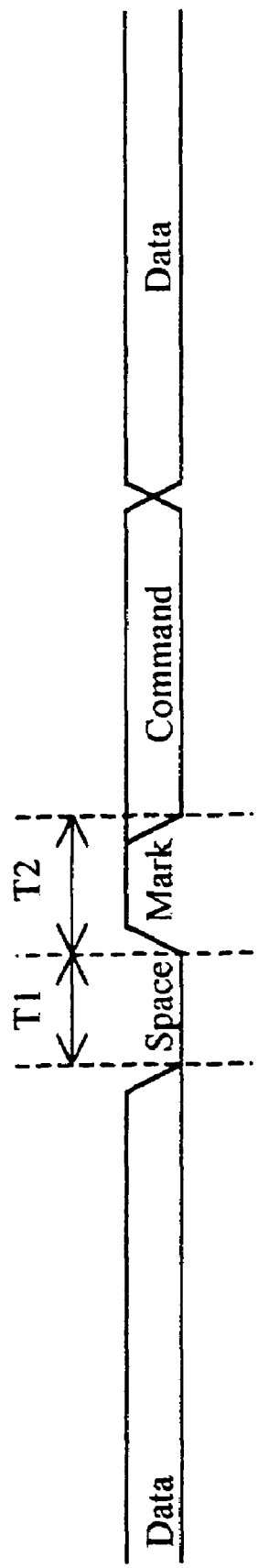
FIG. 8 is a timing diagram illustrating the responses of a PC under the control of the media and signalling processor of FIG. 5.

Reference is now made to FIGS. 7 and 8 which are timing diagrams illustrating the responses of telephone equipment and a PC, respectively, under the control of media and signalling processor 180.

T1 is the minimum interval to hold TXD line low for causing a break condition: 87 μsec. (10 bits).

T2 is the minimum guard time from end of break condition to the start of command/acknowledge transmission: 8.7 μsec. (1 bits).

The media and signalling processor 180 preferably accepts any command that may be sent from the PC during a response procedure, but typically remains in a Break condition until an Acknowledge command is sent from the PC. If the PC does not respond to a Break signal within approximately 5 msec, the processor 180 typically returns to Mark, and tries again to signal with Break to the PC, typically every approximately 5 msec.

Thus the transfer time is typically: Command from PC=4–5 bytes, and Response from S-Phone=7–8 bytes, i.e. a total of 11–13 bytes.

The terms 'Break', 'Mark' and 'Acknowledge' are used with reference to the standard terminology for a RS 232 interface.

A preferred format for the Commands/Responses is as follows:

All commands/responses, except Acknowledge response, are in the following format:
<prefix><command/response>[parameter]
? <prefix> -start of command, (ASCII 10H).
? <command/response> -Command/Response byte.
? [parameter] -optional—extra byte for extended Commands/Responses.

The Acknowledge response format is preferably as follows:
One byte, saving transmission time:
<acknowledge> -ASCII 06H.
Command/Response byte:

| Ext. | $CR_6$ | $CR_5$ | $CR_4$ | $CR_3$ | $CR_2$ | $CR_1$ | $CR_0$ |
|---|---|---|---|---|---|---|---|

Ext.: 1 = Extended command/response. The command is followed by a parameter.
$CR_{0-6}$: Command/Response code bits.

A preferred frequency/tone detection method using square wave input, typically employed by the media and signalling processor 180 is now described. This method preferably can be used in digital MPUs, can be used for detection of single frequency tones, and can be used to identify voice presence from other coherent signals on a phone line. It preferably also identifies US dual tones as a single frequency tone with a higher error rate.

Preferred parameters include:
Low_F: lowest frequency to detect, used to identify silence.
ERROR: maximum difference typically allowed between two following square waves.
LowTone: low boundary for a tested tone frequency range.
HighTone: high boundary for a tested tone frequency range.
Ntone: number of consistent waves in the frequency range of the tested tone to determine tone detection.
Nvoice: number of inconsistent waves to determine voice detection.
ToneCounter: counter for NTone consistent waves in the frequency range of the tested tone.
VoiceCounter: counter for Nvoice inconsistent waves.

F1>1/Low_F ? - - - -> tone detected: silence. Reset all counters.
|F1−F2|>=ERROR ? - - - -> VoiceCounter++ Reset all other tone counters.
VoiceCounter=NVoice ? - - - -> tone detected: voice. Reset all counters.
1/HighTone<=F1<=1/LowTone - - - -> ToneCounter++ Reset all other tone counters, exclude VoiceCounter.
ToneCounter=NTone ? - - - -> tone detected: tone. Reset all counters.

Figure 12:
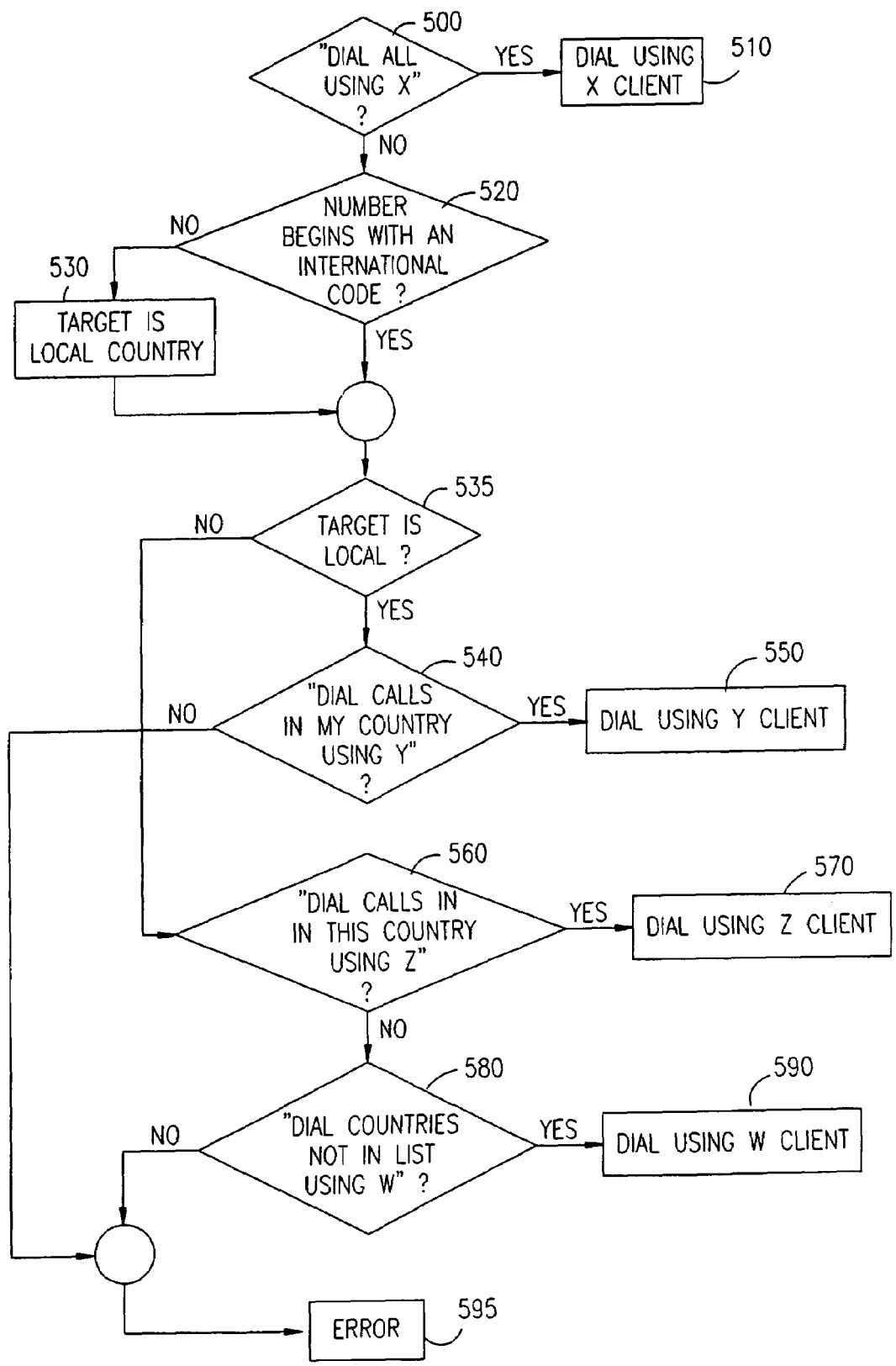
FIG. 12 is a simplified flowchart illustrating a preferred method for selecting a client according to a predefined rules set, performed by the digital telephone and media switch controller of FIG. 5.

Returning now to FIG. 5, the digital telephone media switch controller 190 may, for example, comprise a suitably programmed personal computer. Alternatively, the digital telephone media switch controller 190 may, for example, comprise a suitably programmed microprocessor, which is not a PC. A simplified flowchart illustration of a preferred program for the controller is described in FIGS. 9, 10 and 12.

In one embodiment of the present invention the user of the system, when making a telephone call, is able to manually switch between dialing via IP or PSTN.

Figure 9:
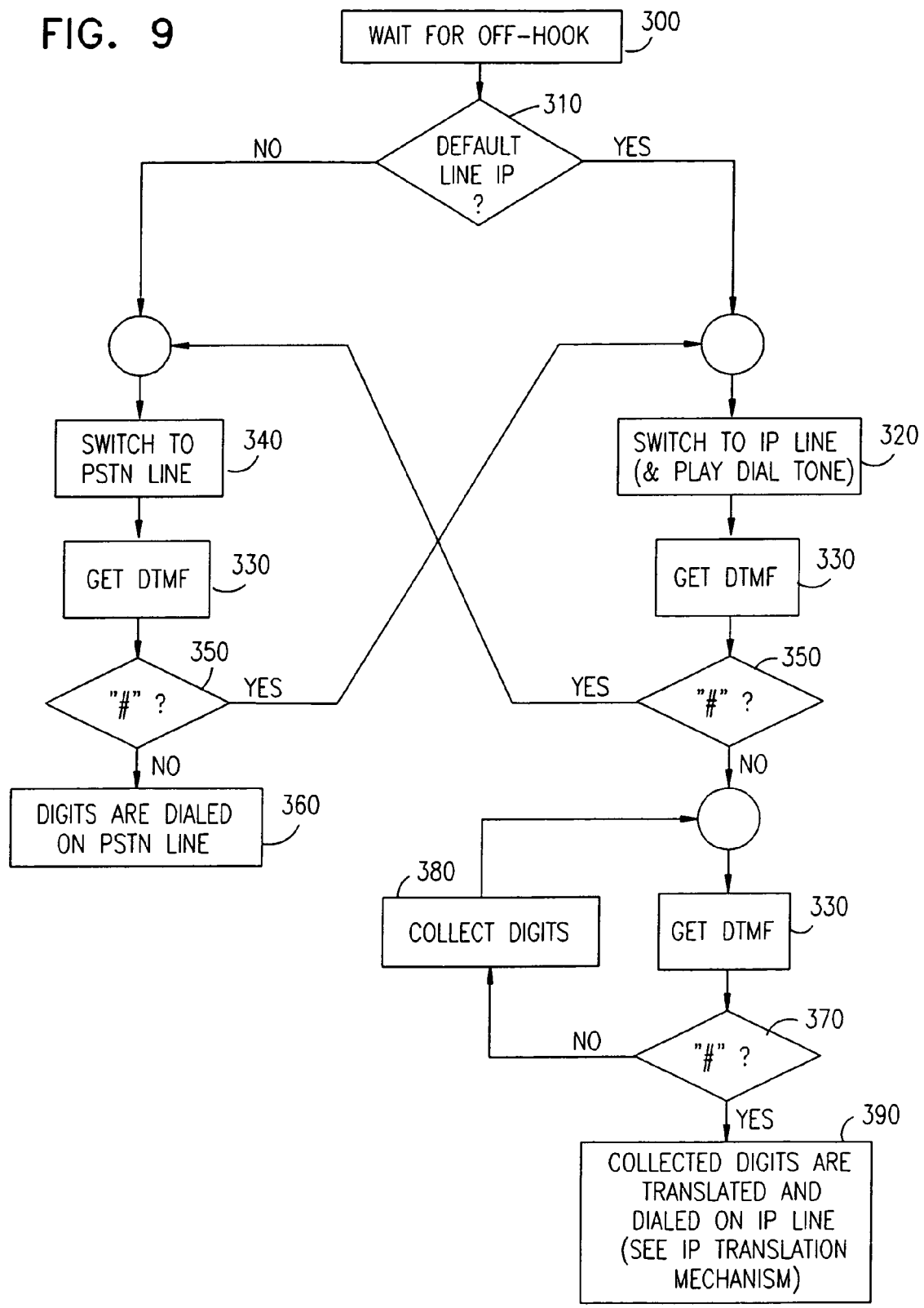
FIG. 9 is a simplified flowchart of a preferred method for the operation of the digital telephone and media switch controller of FIG. 5, allowing a user to manually dial either PSTN or IP calls.

FIG. 9 is a simplified flowchart of a preferred method for the operation of the digital telephone and media switch controller 190 of FIG. 5, allowing a user to manually dial either PSTN or IP calls. When the handset is taken 'off-hook', step 300, or any equivalent step which is typically the prelude to dialing from the telephone equipment 100, the device typically switches to a default state. The default state is preferably user-defined during configuration, and in this embodiment the default state is either IP or PSTN.

All user-defined configuration of the system of the present invention preferably occurs upon first use, however reconfiguration may be performed at any time. Configuration typically is via a set-up screen on a PC, however configuration may alternatively occur via DTMF via the telephone equipment 100.

If the default line is IP (yes at step 310), the digital telephone switch controller 190 preferably switches to an IP line (step 320). Typically, upon switching to an IP line, the device 85 transmits a dial-tone signal (step 320) to the telephone equipment 100, until a keypad button is pressed. In response, the media and signal processor 180 typically receives DTMF signalling (step 330), from the telephone equipment 100, via the ringing SLIC 140, the media signal gateway 160, and the sensor array 210. The media and signalling processor 180 typically either translates the signals to commands, which commands are transmitted to the switch controller 190, or media and signalling processor 180 transmits the signals directly to the digital telephone switch controller 190 where they are translated.

If the default line is not IP (no at step 310), then the switch controller 190 typically switches to a PSTN line (step 340), and receives the DTMF signal (step 330). Typically, upon switching to a PSTN line, the device plays the central office's (CO's) dial-tone until the user begins to dial.

If the user presses (step 350) a configurable 'Line Switching Digit' before any other digit (e.g. '#' by default), the device preferably switches to the other line, i.e. from PSTN to IP, or from IP to PSTN.

If a user starts dialing on a PSTN line beginning with any digit other than the predefined 'Line Switching Digit' (step 360), then the PSTN call is typically dealt with in the normal fashion.

It is appreciated that since all digits, including the 'Line Switching Digit', are transferred directly to the PSTN line when switched to it, the 'Line Switching Digit' is preferably selected to be a digit that does not have a special meaning to the CO or private branch exchange (PBX) to which the system is connected.

If a user starts dialing on an IP line (step 370) beginning with any digit other than the predefined 'Line Switching Digit', the digits are typically collected and stored in a buffer (step 380) until the user dials the 'Send' digit (e.g. '#'). Once the 'send' digit has been entered, the collected digits (i.e. a telephone number) are preferably transferred to the IP translation mechanism to determine how to dial them (step 390).

A call dialed over an IP line is typically of the type PC-to-PC, or PC-to-Phone. It is appreciated, however, that while one preferred embodiment of the invention is described herein with reference to PC-to-PC or PC-to-Phone calls, the present invention applies equally to calls of the type net-to-PC, PC-to-net, net-to-net, or net-to-phone.

Figure 10:
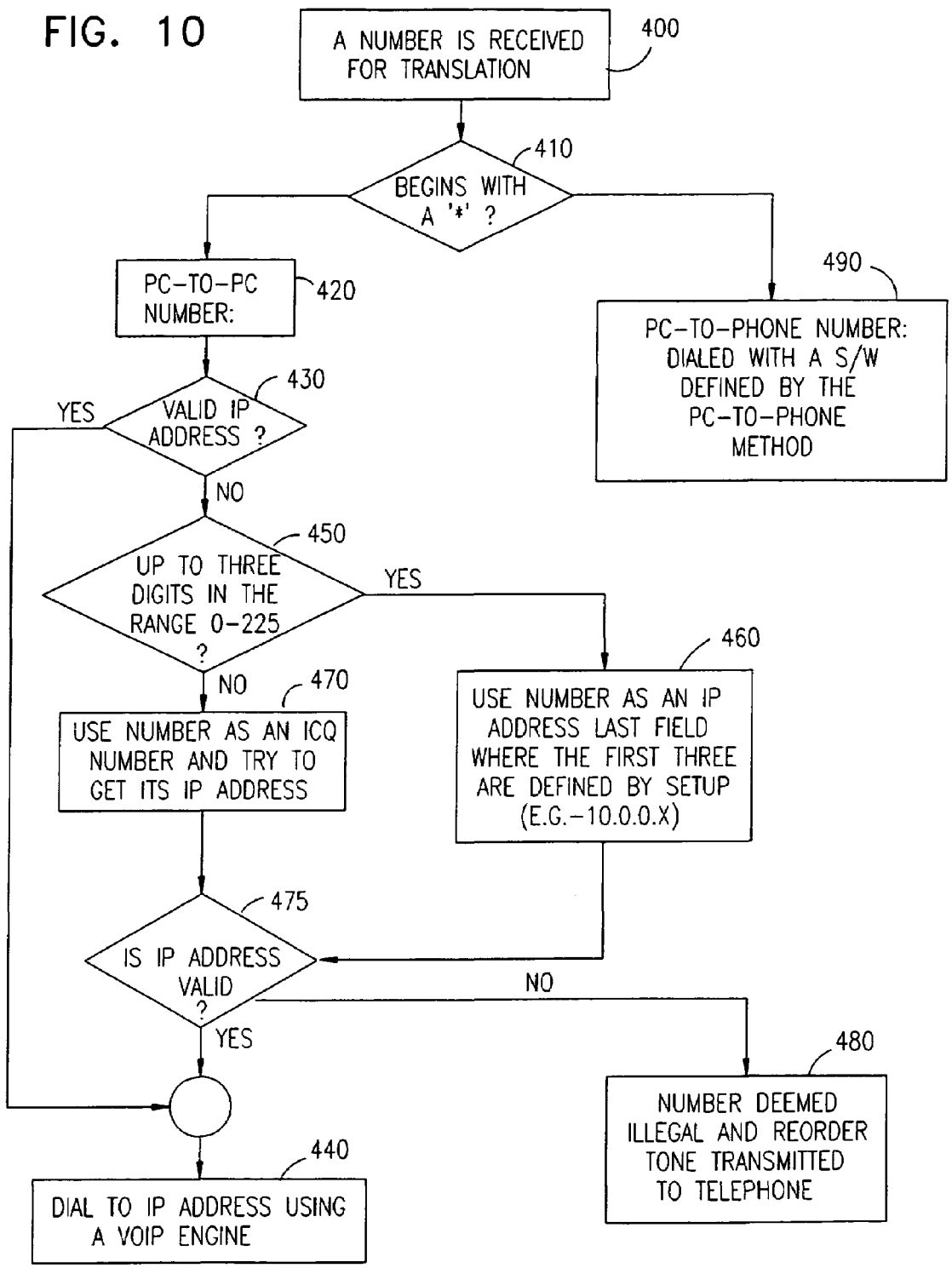
FIG. 10 is a simplified flowchart illustrating a preferred mode of operation of the IP translation mechanism of the digital telephone and media switch controller of FIG. 5.

To determine the type of call and the dialing mechanism preferably utilized, the method of FIG. 10 is preferably employed.

FIG. 10 is a simplified flowchart illustrating a preferred mode of operation of the IP translation mechanism of the digital telephone and media switch controller 190, corresponding to step 390 of FIG. 9.

If the number dialed by a user over an IP line begins with a pre-defined digit, i.e. "PC2PCPrefix", (e.g. '*' by default; step 410), it is preferably dialed as a PC-to-PC call (step 420). In this case the dialed number is preferably translated to an IP address. The predefined digit PC2PCPrefix is preferably user-configurable, via software.

A preferred translation mechanism is now described:

If the number is a valid IP address 430 (e.g., 139.92.184.76) the number is typically dialed using an engine such as a VoIP engine (step 440). As conventional telephone equipment does not have a button for a dot '•', the dots are typically represented by an asterisk '*'.

A VoIP engine (described below with reference to FIG. 11) typically comprises the following functions: signalling protocols such as H.323, MGCP and SIP; and voice compression and echo cancellation functions, preferably allowing the engine to receive and transmit voice packets.

If the number is a short number, typically in the range of 0–255 (step 450), the number is typically considered as an IP/PBX or network/PBX extension, and is combined with a pre-defined mask, configurable by software (e.g. "10.0.0"), to make a valid IP address (step 460), and dialed (step 440).

If the number is not a valid IP address, and the number is not a short digit in the range of 0–255, the number is preferably transferred to a mechanism such as Mirabilis ICQ as an ICQ# for translation into an IP address (step 470), and dialed (step 440).

If the above procedure does not yield a valid IP address the number is deemed to be illegal, and a reorder tone is typically transmitted to the telephone equipment 100.

Figure 11:
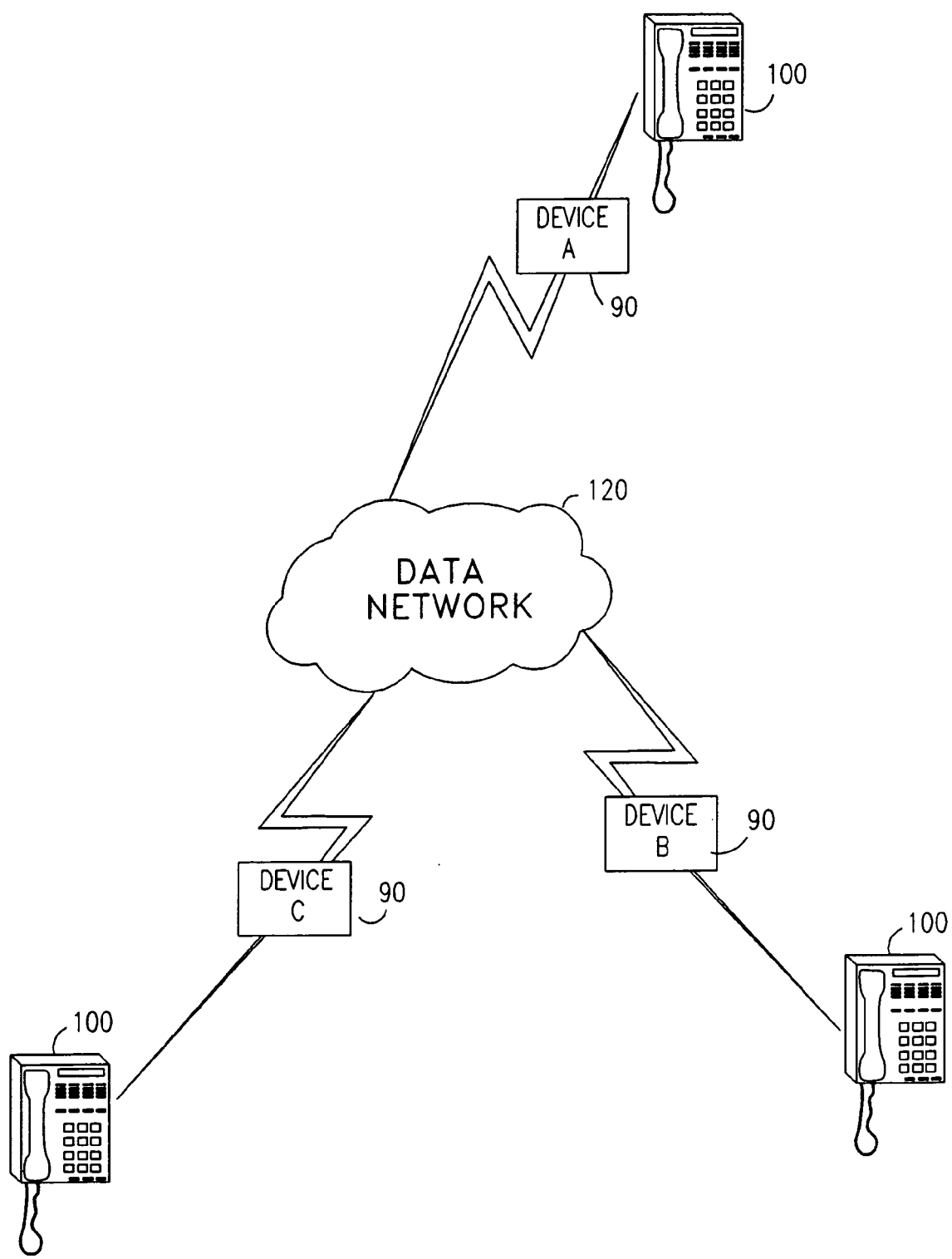
FIG. 11 is a simplified functional block diagram of a VoIP (voice over IP) engine system providing communication between conventional telephone instruments, via a data network, constructed and operative in accordance with a preferred embodiment of the present invention.

A preferred method for connecting phone calls over an IP network, using a VoIP engine (step 440) is now described with reference to FIG. 11, which is a simplified functional block diagram of a VoIP (voice over IP) engine system providing communication between conventional telephone instruments, via a data network, constructed and operative in accordance with a preferred embodiment of the present invention.

Device A, while connected to data network 120, preferably sends a message containing its personal ID and IP address to all other devices connected via the data network 120, i.e. devices B and C. At least once in each predefined period, which is typically up to about 30 seconds, device A preferably sends a 'keep alive' message to the data network 120. Each device connected to data network 120 that received the message from device A, preferably, in return, send their personal details and IP address to device A. At least once in each predefined period, which is typically up to about 30 seconds, all other devices, i.e. devices B and C, preferably send a 'keep alive' message to the data network 120. Each device is thus preferably operative to store details of other connected devices in a 'connected' list in its memory, enabling that device to know which other devices are connected and which are not connected. When one of the devices does not send a keep alive period within a certain period the other devices typically delete this device from the connected list.

A preferred method of making a phone call via this engine is now described.

A local phone user picks up the handset of telephone equipment 100 and waits for a dial tone. In the absence of a dial tone the user typically hangs up the phone, and waits for a dial tone. If the user receives a dial tone he typically dials the number of a remote user using the telephone keypad, followed by an "end of number" key, e.g. "#". The device 90 preferably translates the number to an IP address taken from a preprogrammed table containing telephone numbers and their related IP addresses. This table is typically updated from the information which was received from other devices connected to the data network. Telephone numbers are preferably constant in this table, even if the IP address and details changes.

If the number is not valid, i.e. not in the list, a reorder tone is preferably sent to the local phone. If the remote user is busy, a busy tone is preferably sent to the local phone. If the remote user answers, voice packets are preferably transferred over the data network from the local user device to the remote user device, and vice versa.

When one of the parties unhooks the phone, a termination signal is preferably sent to the other party and the session ends. Both parties are then typically ready to create or receive a new phone call.

Referring back to FIG. 10, if the number does not begin with the "PC2PCPrefix", it is typically dialed as a PC-to-Phone target (step 490). Dialing is typically performed using one of a list of PC-to-Phone clients supported by the software (e.g., Net2Phone, Delta-Three, etc.). To determine which client is used, a PC-to-Phone Dialing-Rules mechanism is preferably utilized.

The software setup of the digital telephone and media switch controller 190 preferably contains a Dialing-Rules wizard enabling the user to define a set of rules for dialing PC-to-Phone targets. The client to be used is preferably selected according to the predefined rules set, in a procedure described with respect to FIG. 12.

If there is a rule such as "Dial ALL calls using X client" 500, which typically supersedes all other rules, then the call is made using X client (step 510).

A number is typically tested to see whether it begins with an international code (step 520). If the number does not begin with an international code, it is typically defined as a local call 530. In the presence of a rule such as "Dial calls within my country using Y client" 540, then if the target is local ('yes' at step 535), the call is preferably made using Y client (step 550).

If the target is not local ('no' at step 535), and a PC-to-Phone client, Z, has been designated for that particular target country (step 560), the phone call is preferably made using Z client (step 570).

In the absence of a rule designating a particular client for the particular target country 560, then in the presence of a rule such as "Dial countries NOT in the list using W client" 580, the call is preferably made using W client (step 590).

If no rule matches the specified target, i.e. error 595, dialing is preferably stopped, and a reorder tone is typically played.

It is particular feature of a preferred embodiment of the present invention that the system is operative to record IP calls on the local level, preferably by the user's computer. It is appreciated that this recording can preferably be performed while using any IP-Client to make calls if the client is using a mechanism such as the Microsoft 'WAVE' mechanism (WIN32SDK/DDK, by Microsoft Development Network; www.microsoft.com) to handle audio streams.

Previous difficulties that existed in recording such a call included that the wave/in & wave/out drivers are used in a way opposite to their names, i.e. 'WAVE/OUT' is used to handle an incoming voice stream, while the 'WAVE/IN' driver is used to create the outgoing stream. Another major disadvantage was the fact that most wave-drivers do not allow for multiple instances, and so no other application can use a wave driver while in use by the IP Client.

The ability of the present invention to record IP calls on the local level, preferably by the user's computer, overcomes these prior disadvantages in the following manner.

In a preferred embodiment, recording is achieved by adding a 'virtual' wave/in device to the device wave-driver. The virtual device acts as a standard wave device for the Microsoft MMSYSTEM mechanism (WIN32SDK/DDK, by Microsoft Development Network; www.microsoft.com), but is typically dependent upon the regular wave-driver for streaming.

When the device 85 is open and a call is in progress, there are typically two audio streams running, one for audio-out to the telephone equipment 100, via the device 85, and the other for audio-in from the telephone equipment 100.

Dual duplex digital recording is typically performed as described below.

The real time analog mixer 235 of media signal gateway 160 is preferably operative to mix analog data from the PSTN 110 and the telephone equipment 100. This mixed analog information is transferred, via echo control unit 175, into digital information by codec 165, processed by DSP 170, and the digitized information is transferred via the media and signalling processor 180 and interface 200 to the digital telephone switch controller 190. The digital telephone switch controller 190 typically mixes this digitized data with digital data signals from data network 120. The digital telephone switch controller 190 is preferably able to store the mixed digital data information, thus recording the telephone conversation at the local level.

The virtual wave-driver typically preferably hooks itself to both streams, and collects audio buffers (preferably in their raw-PCM format). When it has two such buffers (one for audio-in and one for audio-out), it typically mixes them to a single buffer (thus enabling the recording of a two-way call). The mixing is preferably performed via an AGC method to keep the energy level consistent when only one participant in a conversation is talking, i.e. when voice information is being transmitted in one direction from only one of the telephone equipment 100, the PSTN 110, or the data network 120. The joined buffer is typically transferred via the wave mechanism to the recording application.

In a similar manner, another wave-driver is preferably added for wave/out to the IP call, enabling the injection of wave files onto the call. This preferably enables, for example, playing a "Call-Waiting" beep to inform the participants of a call, of a waiting call.

Several scenarios relating to the function of a preferred embodiment of the present invention are now described. The following scenarios are not meant to be limiting, and other scenarios are contemplated.

Scenario 1: Generating a Call from the Telephone Equipment 100

A user picks up the handset of telephone equipment 100, or performs another action which initiates the call procedure. The ringing SLIC 140 preferably detects the telephone equipment 100 is 'off-hook' and preferably transfers the 'off-hook' signal to media and signalling processor 180 via media signal gateway 160. Media and signalling processor 180 preferably transfers a 'be ready to receive' signal to digital telephone media and switch controller 190, and media and signalling processor 180 preferably sends a dial tone to telephone equipment 100 via DSP 170, codec 165, echo control unit 175, media signal gateway 160 and ringing SLIC 140.

The telephone equipment 100 preferably sends DTMF sequence to media and signalling processor 180 via ringing SLIC 140, media signal gateway 160, DTMF sensor 220, which sequence is typically inputted by a user touching buttons on a keypad of telephone equipment 100, and typically ends with the end of sequence "#" key. Media and signalling processor 180 preferably transmits the DTMF sequence to digital telephone media and switch controller 190.

If the digital telephone media and switch controller 190 cannot translate the DTMF sequence to a valid IP address, a reorder signal is typically sent to telephone equipment 100 via media and signalling processor 180, media signal gateway 160 and ringing SLIC 140. If digital telephone media and switch controller 190 translates the DTMF sequence to a valid IP address it preferably sends a signal to the data network 120 that it intends to start a phone call. Digital telephone media and switch controller 190 typically receives one of several possible signals from data network 120.

Upon receipt of a busy signal, digital telephone media and switch controller 190 preferably passes this to 180 to generate a busy signal at telephone equipment 100.

Upon receipt of a ringing signal, digital telephone media and switch controller 190 preferably passes this to media and signalling processor 180 to generate a ringing signal at telephone equipment 100.

Upon receipt of an answer, all other signals are preferably stopped and digital telephone media and switch controller 190 preferably opens a full duplex voice packet channel, forming an open channel from telephone equipment 100 to the media and signalling processor 180, via DSP 170 and sensor array 210.

Telephone equipment 100 can preferably send DTMF signals to digital telephone media and switch controller 190 via DTMF sensor 220, to operate commands from the other participant to the telephone comminication.

If either telephone equipment 100 or the other participant to the call via the data network 120 hangs up, i.e. terminates the phone call, then digital telephone media and switch controller 190 preferably closes the voice packet channel. A signal is preferably sent to the other party that the first party has hung up.

Scenario 2: Receiving a Call from the PSTN 110 During a Pre-Existing Conversation Between the Data Network 120 and Telephone Equipment 100

During a pre-existing telephone conversation between the a user connected via data network 120 and telephone equipment 100, media signal gateway 160 typically detects an incoming ringing signal and caller ID from the PSTN, via DAA 130, and preferably transfers it to media and signalling processor 180. Media and signalling processor 180 preferably sends the information to digital telephone media and switch controller 190, and if digital telephone media and switch controller 190 possesses a display, the caller ID is preferably displayed.

Media and signalling processor 180 preferably sends a 'beep' signal to telephone equipment 100, via DSP 170, codec 165, echo control unit 175, media signal gateway 160 and ringing SLIC 140, to notify the user of telephone equipment 100 that a call is waiting. The user of telephone equipment 100 typically decides whether to accept the call or not.

If the user of telephone equipment 100 decides to accept the call from the PSTN, and hold the call from the data network 120, she typically pushes the '#' button on telephone equipment 100. This typically holds the call from the data network 120 and switches to the call from the PSTN 110. A signal is preferably sent to media signal gateway 160 via ringing SLIC 140, and from media signal gateway 160 to digital telephone media and switch controller 190 via media and signalling processor 180, to hold the call from the data network 120. Media signal gateway 160 preferably also sends a message to media and signalling processor 180 to allow the connection between telephone equipment 100 and PSTN 110 via DAA 130, media signal gateway 160 and ringing SLIC 140.

If the user of telephone equipment 100 decides to switch back to conversation with the user over the data network 120, she typically presses pushes the '#' button on telephone equipment 100 again, and the conversation switches back from the user over the PSTN 110 to the user over the data network 120 in the same way.

If one participant finishes a call, the user of telephone equipment 100 can switch back to the remaining remote participant by pushing the '#' button again.

If the user of telephone equipment 100 decides to accept the call from the PSTN 110, and join this call to the pre-existing conversation to form a three-way conference call, she typically pushes the '*' button on telephone equipment 100. This preferably sends a signal to media and signalling processor 180, which instructs media signal gateway 160 to mix analog signals from PSTN 110 via DAA 130, from telephone equipment 100 via ringing SLIC 140, and from the data network via codec 165.

To switch to conversation with only one participant of the three-way call, and not break the connection to the other participant, the user typically presses "#1" or "#2" to choose the desired channel, and the switching occurs as described above. To close one channel and to continue the conversation with the other channel, the user typically presses "#1" or "#2" to choose the non-desired channel, closes this channel and presses "#" to switch to the desired conversation.

Scenario 3: Receiving a Call from the Data Network 120 During a Pre-Existing Conversation Between the PSTN 110 and Telephone Equipment 100

This scenario is typically as described above in Scenario 2 except as described. Telephone equipment 100 preferably generates a regular telephone call with the PSTN 110 via PSTN/system switch 150, hence avoiding the rest of the system. When a new call is received from data network 120 by digital telephone media and switch controller 190, a signal is preferably sent to media and signalling processor 180 to open a channel to transmit a call waiting 'beep' to telephone equipment 100.

Media and signalling processor 180 preferably sends a signal to media signal gateway 160 to "off-hook" the DAA 130, and then media and signalling processor 180 preferably sends a beep via DSP 170, codec 165, echo controller 175, to media signal gateway 160, and via DAA 130 and PSTN/system switch 150 to telephone equipment 100.

If the user of telephone equipment 100 chooses to accept the call, then the call route is preferably switched from the PSTN/system switch 150 route, to the route via ringing SLIC 140 and media signal gateway 160, thus allowing the media signal gateway 160 to control the calls as above.

Scenario 4: Telephone Equipment 100 Receiving a Call from the Data Network 120

The present invention is preferably operative to receive communication from a data network 120. A telephone call is typically directed from the data network 120 via the device 85 to the telephone equipment 100, via the physical interface 195 and the digital telephone switch controller 190. The digital telephone switch controller 190 preferably receives the incoming message signal, and typically transmits a command signal via interface 200 to the media and signalling processor 180. This command signal typically instructs the media and signalling processor 180 to send a generate ringing voltage signal via the media signal gateway 160 and the ringing SLIC 140, instructing the telephone equipment 100 to ring.

When the telephone equipment 100 is answered, a return signal is typically sent via the ringing SLIC 140 and media signal gateway 160 to the media and signalling processor 180, to the digital telephone switch controller 190.

The digital telephone switch controller 190 preferably opens a voice packet channel via the media and signalling processor 180, the DSP 170, the codec 165, the echo controller 175, the media signal gateway 160 and the ringing SLIC 140 to the telephone equipment 100. When one party hangs up the call is preferably terminated.

If telephone equipment 100 is not answered after a predefined time period, a 'no answer' signal is preferably transmitted to the data network 120 by the digital telephone switch controller 190.

Scenario 5: Single Line Gateway Between PSTN 110 and Data Network 120

Data network 120 typically sends a signal to the digital telephone switch controller 190, that it wishes to generate a phone call to the PSTN and typically sends the desired phone number. Digital telephone switch controller 190 preferably sends the request signal and information to the media and signalling processor 180. Media and signalling processor 180 preferably sends an "off-hook" signal, via media signal gateway 160 and DAA 130, to PSTN 110, i.e. it opens the line between itself and the PSTN 110.

Media and signalling processor 180 preferably detects the status of the PSTN from the progress tone sent back by the PSTN 110. The progress tone may comprise, for example, a dial tone, a busy tone, a 'message waiting' tone etc. If there is not tone, this typically means that the line is not connected. Media and signalling processor 180 preferably sends information regarding the progress tone to digital telephone switch controller 190.

If a dialing tone is detected, media and signalling processor 180 preferably sends the dialing sequence to the PSTN 110 via DTMF signals or by pulse dialing, i.e. a preset tone for a particular PSTN line. The media and signalling processor 180 preferably detects the PSTN line status again.

If the media and signalling processor 180 receives a busy signal from the PSTN 110, a signal is preferably sent to data network 120 via digital telephone switch controller 190 to hang up and repeat.

If the media and signalling processor 180 receives a ringing signal from the PSTN 110, a ringing signal is preferably sent to data network 120 via digital telephone switch controller 190.

If the telephone recipient from the PSTN answers, this is preferably detected by media and signalling processor 180, and a signal is preferably sent to digital telephone switch controller 190 to open a voice packet channel between data network 120 and PSTN 110.

When the media and signalling processor 180 detects that the PSTN 110 hangs up, i.e. terminates the call, a signal is preferably sent to digital telephone switch controller 190 which terminates the call and sends a signal to data network 120 to this effect.

In response to an external signal, typically from the PSTN 110 or the data network 120, the ringing SLIC 140 is preferably operative to act as a local ringing voltage generator, by locally applying single line ringing voltage to telephone equipment 100, thus inducing equipment 100 to produce a ringing tone. For example, a single line voltage generation actuation signal from the PSTN 110, is typically transmitted via the DAA 130, and the media signal gateway 160 to the media and signalling processor 180. The media and signalling processor 180, acting as a voltage generator actuator, preferably transmits the actuation signal via the media signal gateway 160 to the ringing SLIC 140, which preferably generates the voltage to cause the telephone equipment 100 to ring.

It is appreciated that the codec 165, the DSP 170 and the echo control unit 175 are typically only employed for voice processing functions, and not for control functions.

In another preferred embodiment of the present invention, the device (adapter) 85 is implemented on a PC card (PCMCIA), which is plugged into a laptop computer. In this embodiment, the digital telephone switch controller 190 preferably comprises a slot into which the PC card may be inserted. Two major difficulties have been overcome in the PCMCIA embodiment of this invention: size, and power supply.

All the components described herein are of sufficiently small size, and high efficiency power dissipation, to fit onto a standard PCMCIA card. For example, in a preferred embodiment where interface 200 comprises a PCMCIA interface, the power supply is typically the PCMCIA socket, and a DC to DC converter in the ringing SLIC 140 generates high ringing voltage to telephone equipment 100.

In one preferred embodiment, suitable for connecting telephone equipment 100 to a data network 120, and to a PSTN 110, the PCMCIA card is comprised all of the components of device 85.

In an alternative preferred embodiment, suitable for connecting telephone equipment 100 to a data network 120, and not to a PSTN 110, the DAA 130, the PSTN/system switch 150, and the caller ID sensor 230 are preferably eliminated from the PCMCIA card, and the PCMCIA card comprises all other components of device 85.

It is appreciated that the various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

In the appended claims the term "telephone" refers to a telephone suitable for attachment to the public switched telephone network, and includes telephones that produce an output in analog form and which produce tones or pulses in the widely recognized format for dialing and other purposes.

What is claimed is:

1. A method for setting up a conference call between three participants, the method comprising:

providing a digital telephone switch controller interfacing between a local telephone instrument, the PSTN and a computer connected to the computer network and operative to analyze signaling information and voice information arriving from at least one of the local telephone instrument, the PSTN and the computer network and to responsively transmit at least one of voice information and signaling information to at least one of the local telephone instrument, the PSTN and the computer network; and using the digital telephone switch controller to set up a conference call between the local telephone instrument, a remote telephone instrument, via the PSTN, and a remote subscriber to the computer network, via the computer network, wherein the digital telephone switch controller is autonomous respectively of said local telephone instrument, said computer and the PSTN.

2. A method according to claim 1 wherein the controller receives digital voice information from the remote computer network subscriber, via the computer network.

3. A method according to claim 1 wherein the controller receives analog voice information from the local telephone instrument.

4. A method according to claim 1 wherein the controller receives analog voice information from the PSTN.

5. A telephone communication system providing communication between a multiplicity of telephone instruments via at least one PSTN and at least one computer network, the system comprising:

a digital telephone switch controller interfacing between a local telephone instrument, the PSTN and a computer connected to the computer network and operative to analyze at least signalling information arriving from at least one of the local telephone instrument, the PSTN and the computer network and to perform local least cost call routing of corresponding voice information to a remote telephone instrument, wherein the digital telephone switch controller is autonomous respectively of said local telephone instrument, said computer and the PSTN.

6. A telephone communication system providing communication between a multiplicity of telephone instruments via a PSTN and a computer network, the system comprising:

a digital telephone switch controller interfacing between a local telephone instrument, the PSTN and a computer connected to the computer network and operative to analyze at least signaling information arriving from at least one of the local telephone instrument, the PSTN and the computer network and to route at least one of voice information and signaling information accordingly, wherein the digital telephone switch controller is autonomous respectively of said local telephone instrument, said computer and the PSTN.

7. A telephone communication system according to claim 6 and wherein said digital telephone switch controller comprises a slot for a PC card.

8. A telephone communication system providing communication between a multiplicity of telephone instruments via a PSTN and a computer network, said system comprising a local level in which a plurality of devices are connected together at a node of the PSTN, said system being operative to record said communication at said local level, the system comprising:
- a recording device for recording said communication at said local level, and
- a digital telephone switch controller interfacing between a local telephone instrument, the PSTN and a computer network and operative to route voice information arriving from at least one of the local telephone instrument, the PSTN and the computer network to said recording device, wherein the digital telephone switch controller is autonomous respectively of said local telephone instrument, said computer and the PSTN.

* * * * *